US009065188B2

(12) United States Patent
Liegl et al.

(10) Patent No.: US 9,065,188 B2
(45) Date of Patent: Jun. 23, 2015

(54) ELECTRICAL CONNECTION

(75) Inventors: Erwin Liegl, Eberdingen (DE); Rainer Jakoby, Wiensheim (DE); Anselm Gademann, Taipei (TW); Birgit Moeller, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 283 days.

(21) Appl. No.: 13/812,548

(22) PCT Filed: Jul. 1, 2011

(86) PCT No.: PCT/EP2011/061093
§ 371 (c)(1),
(2), (4) Date: Jan. 28, 2013

(87) PCT Pub. No.: WO2012/013446
PCT Pub. Date: Feb. 2, 2012

(65) Prior Publication Data

US 2013/0118804 A1 May 16, 2013

(30) Foreign Application Priority Data

Jul. 27, 2010 (DE) ......................... 10 2010 038 465

(51) Int. Cl.
*H01R 4/18* (2006.01)
*H01R 11/22* (2006.01)
*H02G 15/02* (2006.01)

(52) U.S. Cl.
CPC .................. *H01R 4/18* (2013.01); *H01R 4/185* (2013.01); *H01R 4/187* (2013.01)

(58) Field of Classification Search
USPC ............................... 174/94 R, 84 C; 219/121
See application file for complete search history.

(56) References Cited

U.S. PATENT DOCUMENTS 3,501,736 A * 3/1970 Norris ........................... 439/353
3,566,008 A * 2/1971 Ettlinger et al. ............ 174/94 R
3,717,842 A * 2/1973 Douglas, Jr. .................... 29/860
4,784,617 A * 11/1988 Oda .............................. 439/595
4,946,408 A 8/1990 Garrett et al.
4,966,565 A * 10/1990 Dohi ............................. 439/874
5,025,554 A 6/1991 Dohi
5,181,862 A * 1/1993 Hawk et al. ................... 439/595
(Continued)

FOREIGN PATENT DOCUMENTS

DE 3921990 1/1990
DE 19644794 * 5/1997 ............. H01R 12/04
(Continued)

OTHER PUBLICATIONS

International Search Report for Application No. PCT/2011/061093 dated Sep. 23, 2011 (2 pages).

*Primary Examiner* — Timothy Thompson
*Assistant Examiner* — Michael F McAllister
(74) *Attorney, Agent, or Firm* — Michael Best & Friedrich LLP

(57) ABSTRACT

The invention relates to an electrical connection having at least one plug contact element (10) and a connection wire (1) which is connected to the plug contact element (10), wherein the connection between the at least one plug contact element (10) and the connection wire (1) is established by means of at least one force-fitting connection (12, 13) which is in the form, in particular, of a crimped connection. According to the invention, provision is made for the force-fitting connection (13) to additionally be provided with a cohesive connection (15) or a soldered connection.

14 Claims, 4 Drawing Sheets

(56) References Cited

U.S. PATENT DOCUMENTS

| | | | | | |
|---|---|---|---|---|---|
| 5,222,898 | A * | 6/1993 | Fedder et al. | 439/101 |
| 5,519,140 | A * | 5/1996 | Gurfinkel et al. | 544/319 |
| 5,519,170 | A * | 5/1996 | Nabeshima | 174/74 R |
| 5,567,187 | A * | 10/1996 | Bellinger | 439/877 |
| 5,772,454 | A | 6/1998 | Long, Jr. | |
| 5,824,962 | A * | 10/1998 | Katsuma | 174/135 |
| 5,904,600 | A * | 5/1999 | Tomita et al. | 439/877 |
| 5,971,816 | A * | 10/1999 | Chaillot | 439/852 |
| 6,334,798 | B1 * | 1/2002 | Ushijima et al. | 439/879 |
| 6,435,921 | B2 * | 8/2002 | Kojima et al. | 439/752 |
| 7,705,265 | B2 * | 4/2010 | Asakura et al. | 219/121.64 |
| 8,167,666 | B2 * | 5/2012 | Koga et al. | 439/852 |
| 2005/0176298 | A1 * | 8/2005 | Flowers et al. | 439/595 |
| 2006/0057903 | A1 * | 3/2006 | Asakura et al. | 439/874 |

FOREIGN PATENT DOCUMENTS

| | | | | |
|---|---|---|---|---|
| DE | 19902405 | * | 8/2000 | H01R 4/18 |
| DE | 202004001363 | | 4/2004 | |
| DE | 102006025661 | | 12/2007 | |
| DE | 102007020210 | | 12/2007 | |
| EP | 1206005 | | 5/2002 | |
| JP | 2009259498 | | 11/2009 | |
| JP | 2010123449 | | 6/2010 | |

* cited by examiner

ELECTRICAL CONNECTION

BACKGROUND OF THE INVENTION

The invention relates to an electrical connection.

An electrical connection of this kind is already generally known and serves in electrical devices, for example in control devices or aggregates in the automotive field, to electrically connect a connection wire to a plug contact element. In so doing, a force-fitting connection in the form of a so-called crimped connection is generally used. In the case of a crimp connection, connecting regions of the plug contact element are connected to the connection wire by means of plastic deformation. Such a crimp connection is only conditionally detachable and cannot for the most part be repaired.

In addition, plug connections are known which have a plug contact element and a mating contact. These two elements are likewise connected to one another by a force fit or a spring effect, wherein a connection of this kind can be detached and repaired as often as desired.

The disadvantage with both force-fitting connections is that the contact points of the connection have a non-linear resistance behavior in the case of very low electrical currents, which include particularly currents in the range of nanoamperes or below. Said non-linear resistance behavior changes the electrical information which should be transferred through the electrical connection as unchanged as possible.

SUMMARY OF THE INVENTION

On the basis of the prior art described above, the aim underlying the invention is to further develop an electrical connection according to the preamble of claim 1 such that the electrical connection also has a resistance behavior which is as linear as possible when conducting very low currents. According to the invention, this aim is met by virtue of the fact that said connection comprises further a cohesive connection in addition to the force-fitting connection. The invention thus takes advantage of a relatively easy assembly as is generally the case with a force-fitting connection and subsequently changes or modifies the force-fitting connection by an additional cohesive connection, which ensures a consistently optimal conductivity of the current even in the case of very low currents.

Provision is made in an advantageous modification to the invention for the cohesive connection to be embodied as a welded or soldered connection. A resistance welded, ultrasonic welded or laser welded connection is particularly worth considering here. Each of the aforementioned cohesive connections can be implemented in large-scale production, depending upon the application, with relatively simple means and can be well monitored from a process engineering standpoint.

In a further advantageous embodiment of the invention, provision is made for the crimped connection to be embodied as a double crimp connection. In so doing, the crimping region is divided into two different crimping points, of which the one crimping point serves to connect the plug contact element in a force-fitting manner to the strand of a connection wire, whereas the other crimping point serves to electrically contact the connection wire, wherein insulation is stripped or removed from this region of said strand of the connection wire. Particularly when a tensile load occurs, a strain relief is thereby effected on the connection wire providing the electrical contact.

In a most particularly preferred embodiment of the invention, provision is made for the plug contact element to be electrically contacted to a mating contact element and to be connected to the same in a force-fitting manner and for a further additional cohesive connection to be configured between the plug contact element and the mating contact element. Thus the electrical connection is, e.g., suited for connecting an electrical device to a connection cable, e.g. to the connection cable of a wiring harness in a motor vehicle. In so doing, the transfer of particularly low electrical currents without the loss of information is made possible even at this location by the further additional cohesive connection between the plug contact element and the mating contact element.

As was the case with the first cohesive connection, the further additional cohesive connection is preferably embodied as a welded or soldered connection.

In order on the one hand to facilitate a protected arrangement of the electrical connection in the region where the plug contact element connects to the mating contact element and on the other hand to be able to design the additional cohesive connection in a relatively simple manner, provision is made in a further embodiment of the invention for the plug contact element to be disposed in a connector housing and for the connector housing to have an opening, in particular an aperture, in a connecting region between the plug contact element and a mating contact element, arranged in such a way that the connecting region is accessible from the outside.

In this regard, provision is made in a particularly preferred manner for the connector housing comprising the connecting region thereof to be able to be electrically contacted to the mating contact elements disposed in a housing particularly of an electrical device and for said connector housing to comprise a recess which is disposed so as to at least partially line up with the opening and which can be closed by a cover element. In so doing, a tight and protected arrangement of the connecting region between the plug contact element and the mating contact element in a housing of an electrical device is facilitated.

In order to further improve the process reliability in large scale production of the invention, it is furthermore advantageous if the plug contact element associated with the connector housing is fixed by means of a positive locking connection in the connector housing, in particular by means of a snap-lock connection. In so doing, the plug contact element can be connected and secured to the connector housing in a purely mechanical manner.

An especially tight connection can furthermore be achieved if the connector housing has a seal and interacts with the housing of the electrical device.

Further advantages, features and details of the invention ensue from the following description of preferred exemplary embodiments as well as with the aid of the drawings.

DETAILED DESCRIPTION

Figure 1:
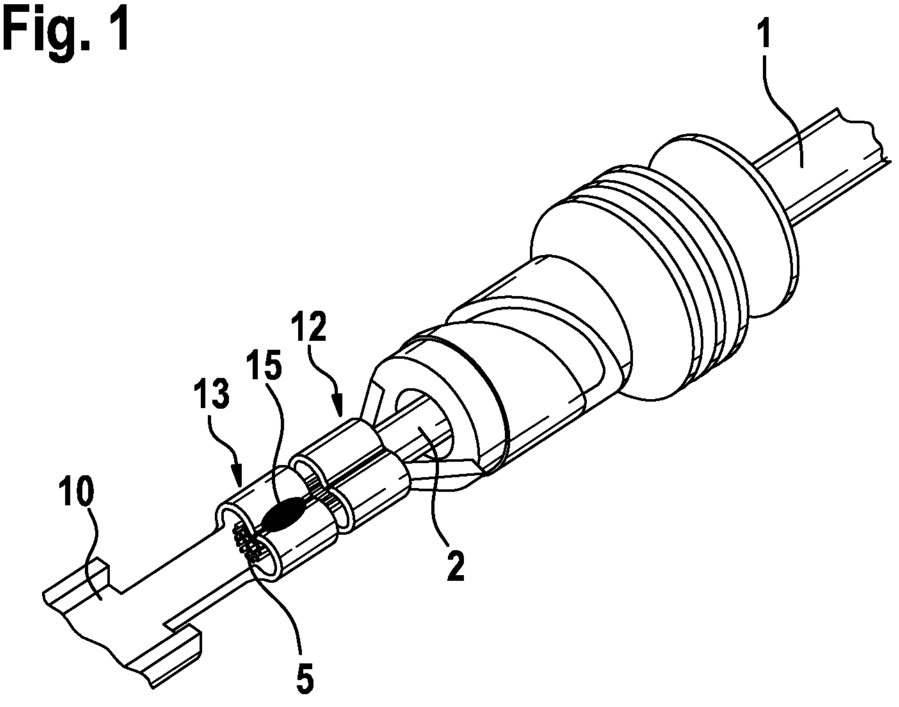
FIG. 1 shows an electrical connection between a plug contact element and a connection wire in the crimping region of said wire in a perspective view.

The same components or respectively components having the same function are provided with the same reference numerals in the figures.

In FIG. 1, an electrical cable in the form of a connection wire 1 (stranded wire) is depicted, which is electrically contacted to a plug contact element in the form of a plug connector body 10. The connection wire 1 has an insulation 2 which encompasses the stranded wires 5. The connection wire 1 is stripped, i.e. bared of the insulation thereof, in the region of the electrical connection thereof to the plug connector body 5.

Figure 2:
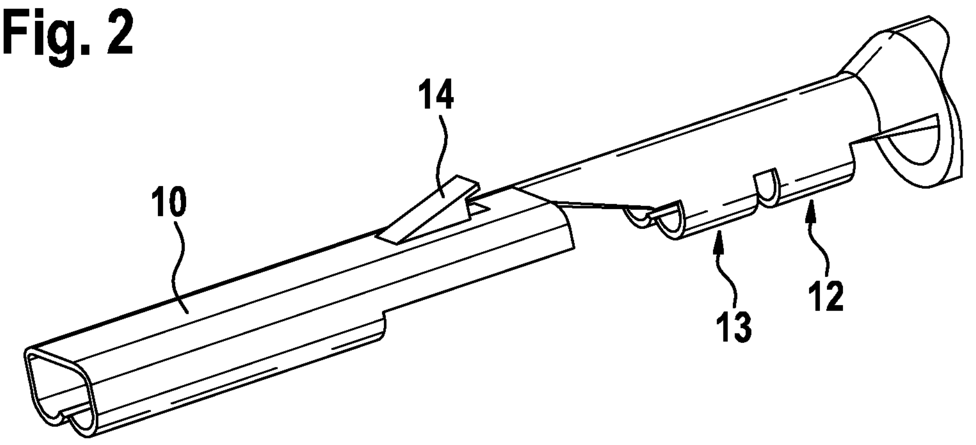
FIG. 2 shows the region of the electrical connection pursuant to FIG. 1 from a different perspective view.

The plug connector body 10, as is known per se, is manufactured as a stamped/bent part from sheet metal and comprises two crimping regions 12, 13, which are spaced apart from one another in the longitudinal direction. In so doing, the first crimping region 12 serves to connect the plug connector body 10 in a force-fitting manner to the insulation 2 in the proximity of the stripped connection wire 1, whereas the second crimping region serves to connect the connection wire 1 in a force-fitting manner to the plug connector body 10. As can be seen with the aid of FIG. 2, said plug connector body 10 comprises yet a locking lug 14, which is manufactured by means of a stamping/bending process and protrudes beyond the actual connector plug body 10, on the side thereof opposite to the two crimping regions 12, 13.

According to the invention, provision is made for the second crimping region 13, which serves to electrically contact the connection wire 5 to the plug connector body 10, to be equipped or respectively provided with an additional cohesive connection. In so doing, the additional cohesive connection 15 is particularly embodied as a welded connection. With regard to a welded connection, depending upon the application, a laser welded, resistance welded or ultrasonic welded connection are particularly worth considering. As an alternative, a soldered connection is also conceivable.

Figure 3:
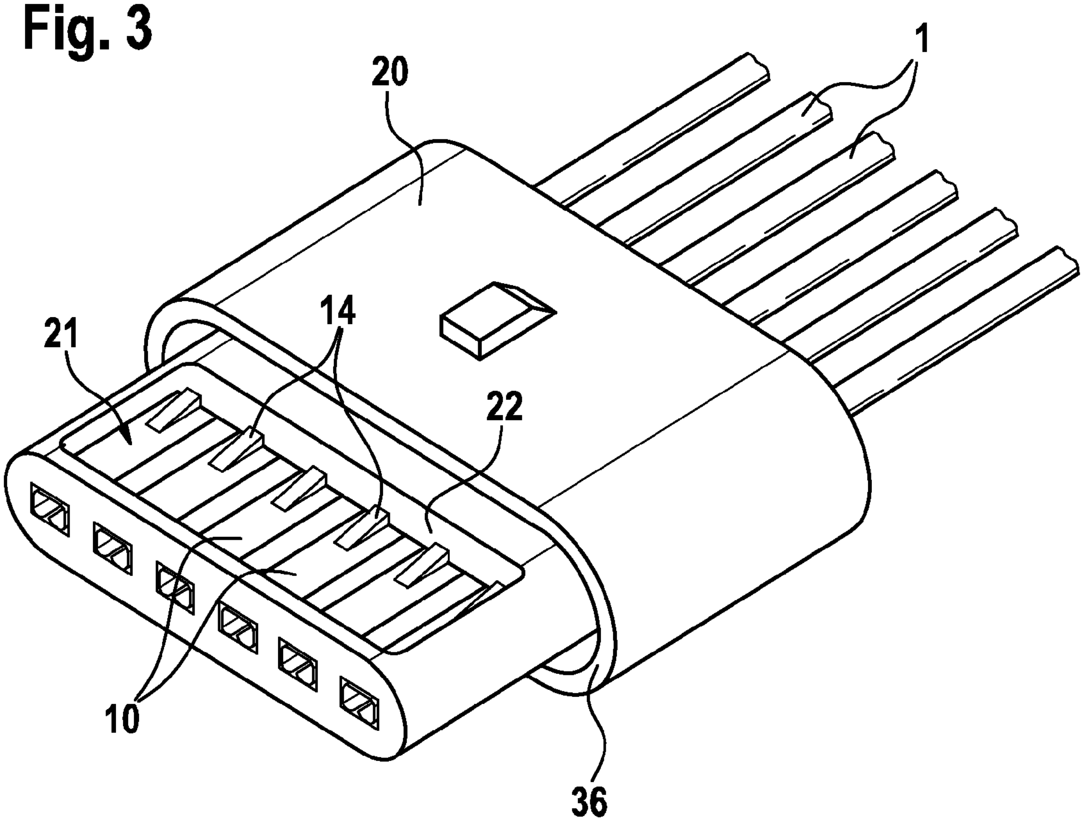
FIG. 3 shows a connector housing comprising a plurality of plug contact elements disposed therein in a perspective view.

In FIG. 3, a connector housing 20 is depicted for use with several plug connector bodies 10, which are disposed parallel and next to one another in the connector housing 20. The connector housing 20 thereby comprises an aperture in the form of an opening 21, the one delimiting wall 22 of which simultaneously serves as a stop for the locking lugs 14 of the plug connector body 10; thus enabling said plug connector body 10 to be accommodated or respectively secured in a positive locking manner in the connector housing 20. It is also important that the region of the opening 21 in the connector housing 20 is arranged in a region, in which a force-fitting connection with mating plugs 24 (see FIG. 4) can occur.

Figure 4:
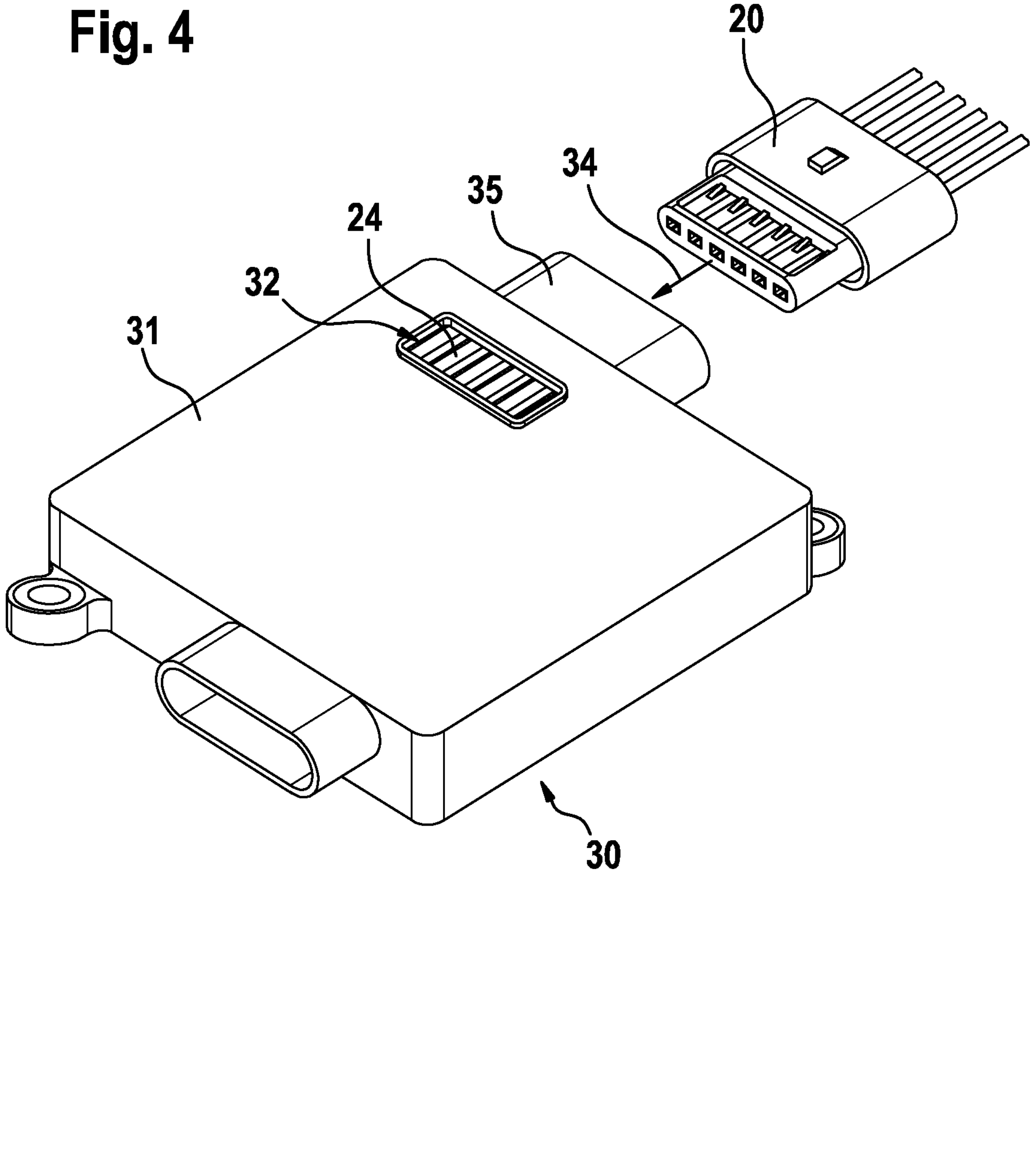
FIG. 4 shows the assembly of a connector housing pursuant to FIG. 3 at a control device in a perspective view.
Figure 6:
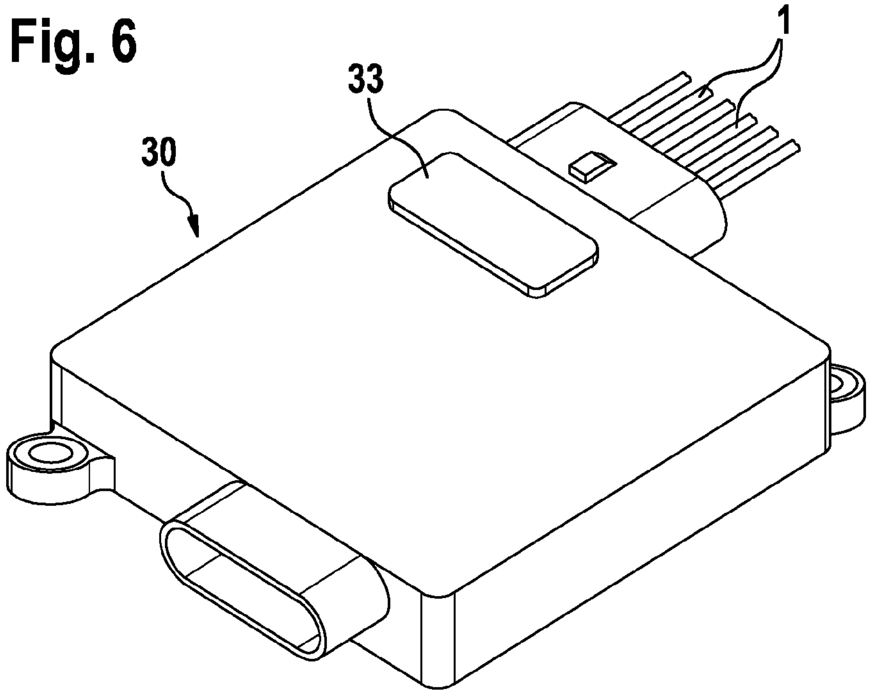

In FIG. 4, an electrical device 30 is depicted, which, for example, comprises an integrated circuit (not depicted) or something similar. The electrical device 30, which can particularly be used in a motor vehicle, comprises a housing 31, which has a recess 32 in the region of the mating plug 24. The recess 32 can be tightly closed by means of a cover element 33 depicted in FIG. 6, e.g. by laser welding. In order to join the connector housing 20 to the electrical device 30 corresponding to the direction of the arrow 34 in FIG. 4, said connector housing 20 is inserted with the region of the opening 21 thereof into a housing section 35. In order to achieve a tight connection between said connector housing 20 and the housing section 35 or respectively the housing 31, either the housing section 35 or else preferably the connector housing 20 comprises yet a seal 36 which can be seen in FIG. 3.

Figure 5:
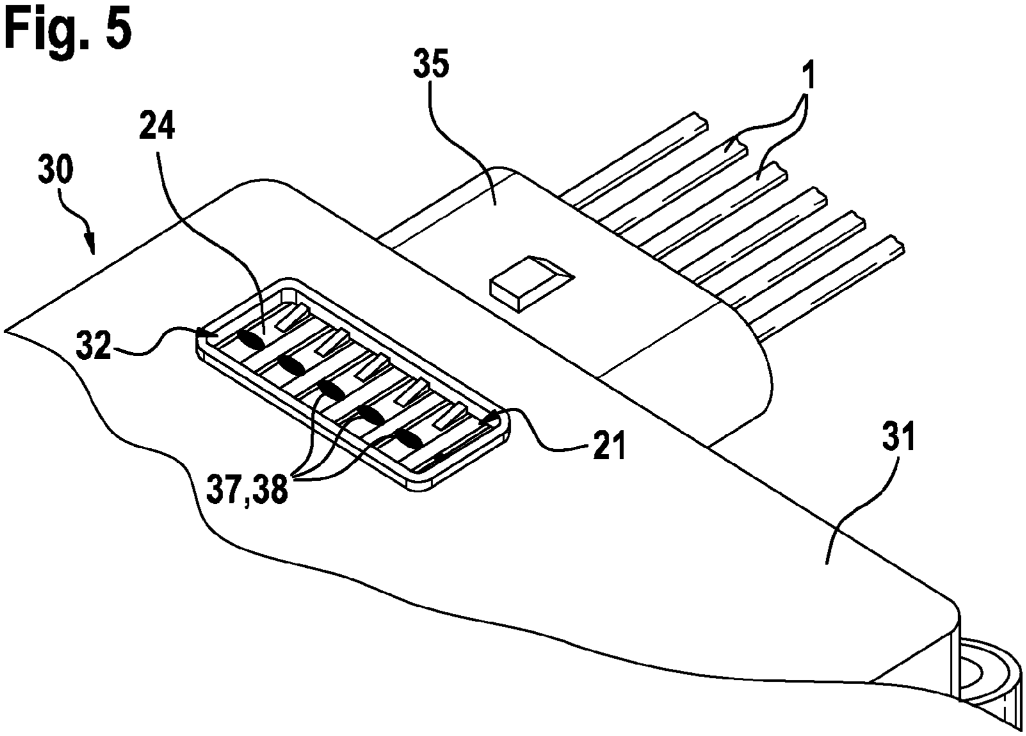
FIG. 5 shows the region of an opening of the control device pursuant to FIG. 4 in the assembled state in a perspective view and FIG. 6 shows the control device connected to the connector housing when the opening of the control device is closed.

In FIG. 5, the state is depicted in which the connector housing 20 is completely inserted into the housing section 35 of the housing 31. It can especially be seen that the opening 21 of the connector housing 20 and the recess 32 of the housing 31 are disposed in alignment with one another; and therefore the connecting region 37 between the plug connector bodies 10 and the mating plugs 24, in which said plug connector bodies are connected to one another in a force-fitting and electrically conductive manner, is accessible and can be worked on from the outside. According to the invention, provision is made for the individual connections between the respective plug connector bodies 10 and the associated mating plugs 24 to be provided respectively with an additional cohesive connection 38 in the connecting region 37. Said additional cohesive connection 38 is also preferably embodied as a soldered or welded connection. In the exemplary embodiment depicted, in which the mating plugs 24 are disposed within the plug connector bodies 10 or rather enclosed by the same, the additional cohesive connection 38 is embodied as a laser welded connection. As soon as said additional cohesive connection 38 is formed, the housing 31 is closed by means of the cover element 33 so that said housing is sealed towards the outside.

The electrical connection which has been described can be modified or transformed in a variety of ways without deviating from the inventive thought. It is thus conceivable for the connector housing 20 to be electrically contacted directly to the mating plugs 24 without said mating plugs being disposed in a separate housing 31 of an electrical device 30. In this case, provision is ideally made for the opening 21 of the connector housing 20 to be closed by means of a separate cover element.

The invention claimed is:

1. An electrical connection having at least one plug contact element (10) and a connection wire (1) which is connected to the plug contact element (10), wherein the connection between the at least one plug contact element (10) and the connection wire (1) is established by means of at least one force-fitting connection (12, 13), characterized in that the force-fitting connection (13) is additionally provided with a first cohesive connection (15) that is a welded connection or a soldered connection, further characterized in that the at least one plug contact element (10) is electrically contacted to a mating contact element (24) and connected to the same in a force-fitting manner and in that an additional cohesive connection (38) that is a welded connection or a soldered connection is provided between the plug contact element (10) and the mating contact element (24).

2. The electrical connection according to claim 1, characterized in that the first cohesive connection (15) is in the form of a welded connection.

3. The electrical connection according to claim 1 wherein the force-fitting connection is a crimped connection.

4. The electrical connection according to claim 1, characterized in that the crimped connection (12, 13) is a double crimp connection.

5. The electrical connection according to claim 1, characterized in that the additional cohesive connection (38) is a welded connection.

6. An electrical connection having at least one plug contact element (10) and a connection wire (1) which is connected to the plug contact element (10), wherein the connection between the at least one plug contact element (10) and the connection wire (1) is established by means of at least one force-fitting connection (12, 13), characterized in that the force-fitting connection (13) is additionally provided with a cohesive connection (15) that is a welded connection or a soldered connection, and characterized in that the plug contact element (10) is disposed in a connector housing (20) and in that the connector housing (20) comprises an opening (21) in a connecting region (37) between the plug contact element (10) and a mating contact element (24) such that the connecting region (37) is accessible from the outside.

7. The electrical connection according to claim 6, characterized in that the connector housing (20) can be electrically contacted via the connecting region (37) thereof to the mating contact elements (24) disposed in a housing (31) and in that the housing (31) comprises a recess (32), which is disposed so as to at least partially line up with the opening (21) and which can be closed by a cover element (33).

8. The electrical connection according to claim 6, characterized in that the plug contact element (10) associated with the connector housing (20) is fixed in said connector housing (20) by a positive locking connection.

9. The electrical connection according to claim 7, characterized in that the connector housing (20) has a seal (36), which interacts with the housing (31).

10. The electrical connection according to claim 6, characterized in that several plug contact elements (10) are disposed parallel next to one another in the connector housing (20).

11. The electrical connection according to claim 1, characterized in that the first cohesive connection (15) is in the form of a laser welded, resistance welded or ultrasonic welded connection.

12. An electrical connection having at least one plug contact element (10) and a connection wire (1) which is connected to the plug contact element (10), wherein the connection between the at least one plug contact element (10) and the connection wire (1) is established by means of at least one force-fitting connection (12, 13), characterized in that the force-fitting connection (13) is additionally provided with a cohesive connection (15) that is a welded connection or a soldered connection, and characterized in that the plug contact element (10) is disposed in a connector housing (20) and in that the connector housing (20) comprises an aperture in a connecting region (37) between the plug contact element (10) and a mating contact element (24) such that the connecting region (37) is accessible from the outside.

13. The electrical connection according to claim 6, characterized in that the connector housing (20) can be electrically contacted via the connecting region (37) thereof to the mating contact elements (24) disposed in a housing (31) of an electrical device (30) and in that the housing (31) comprises a recess (32), which is disposed so as to at least partially line up with the opening (21) and which can be closed by a cover element (33).

14. The electrical connection according to claim 6, characterized in that the plug contact element (10) associated with the connector housing (20) is fixed in said connector housing (20) by a snap-lock connection (14).

* * * * *